United States Patent [19]
Gray et al.

[11] Patent Number: 6,012,735
[45] Date of Patent: Jan. 11, 2000

[54] TRIM PANEL HAVING AIR BAG DOOR

[75] Inventors: John D. Gray, Union, N.H.; Jimmy C. Rogers, Berwick, Me.

[73] Assignee: Textron Automotive Company, Troy, Mich.

[21] Appl. No.: 09/047,558

[22] Filed: Mar. 25, 1998

Related U.S. Application Data

[63] Continuation-in-part of application No. 08/690,854, Aug. 1, 1996, Pat. No. 5,816,609, which is a continuation-in-part of application No. 08/258,720, Jun. 13, 1994, abandoned.

[51] Int. Cl.[7] .................................................. B60R 21/16
[52] U.S. Cl. ....................................... 280/728.2; 280/732
[58] Field of Search .............................. 280/728.2, 728.3, 280/732

[56] References Cited

U.S. PATENT DOCUMENTS

| | | |
|---|---|---|
| 4,893,833 | 1/1990 | DiSalvo et al. . |
| 4,925,209 | 5/1990 | Sakurai . |
| 5,096,221 | 3/1992 | Combs et al. . |
| 5,116,079 | 5/1992 | Rhodes, Jr. . |
| 5,238,264 | 8/1993 | Barnes . |
| 5,362,096 | 11/1994 | Satoh et al. . |
| 5,374,078 | 12/1994 | Amamori et al. . |
| 5,419,583 | 5/1995 | Sakakida et al. . |
| 5,437,470 | 8/1995 | Terai et al. . |
| 5,816,609 | 10/1998 | Gray et al. .......................... 280/728.3 |

*Primary Examiner*—Paul N. Dickson
*Attorney, Agent, or Firm*—Reising, Ethington, Barnes, Kisselle, Learman & McCulloch, P.C.

[57] ABSTRACT

An interior trim panel for a motor vehicle has an opening for deployment of an air bag and a discrete air bag door that is attached to the interior trim panel for closing the opening and for being opened by an air bag when it is deployed. The door includes a retainer that hinges the door to the trim panel and a covering that includes a frangible flap at an end of the retainer that holds down an end of the door and breaks away when the air bag is deployed. An alternate interior trim panel has another discrete air bag door that includes a bracket attached to the retainer for establishing the location of the hinge line. Another alternate interior trim panel arrangement has an integrated or invisible air bag door that includes a bracket attached to the retainer for establishing the location of the hinge line in an invisible door arrangement. Another alternate interior trim panel also includes a bracket having a V-shaped channel that establishes the location of the door hinge line. In addition, side plates integrally extend from opposite sides of the channel to connect to an air bag canister.

10 Claims, 6 Drawing Sheets

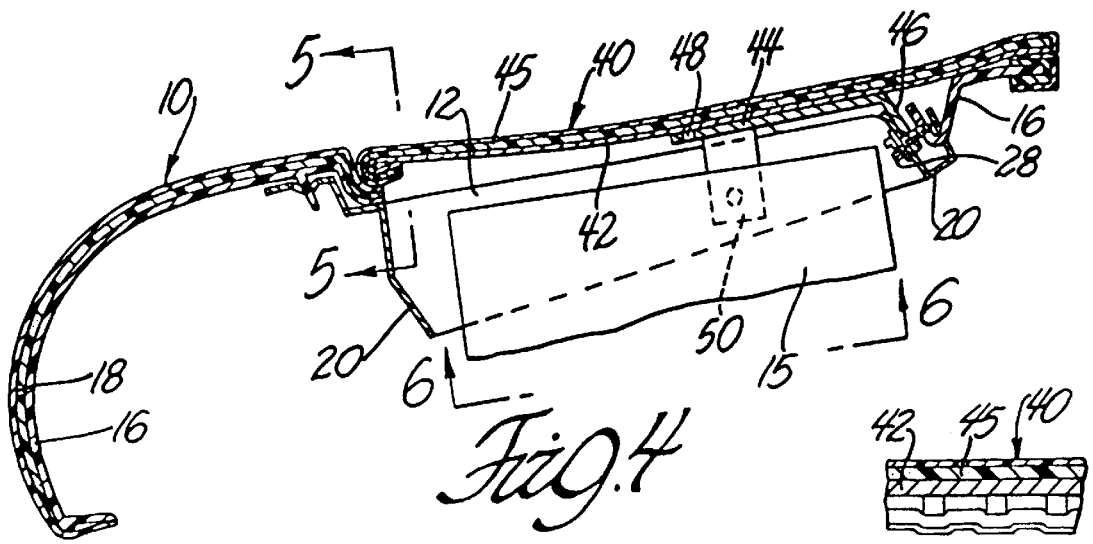
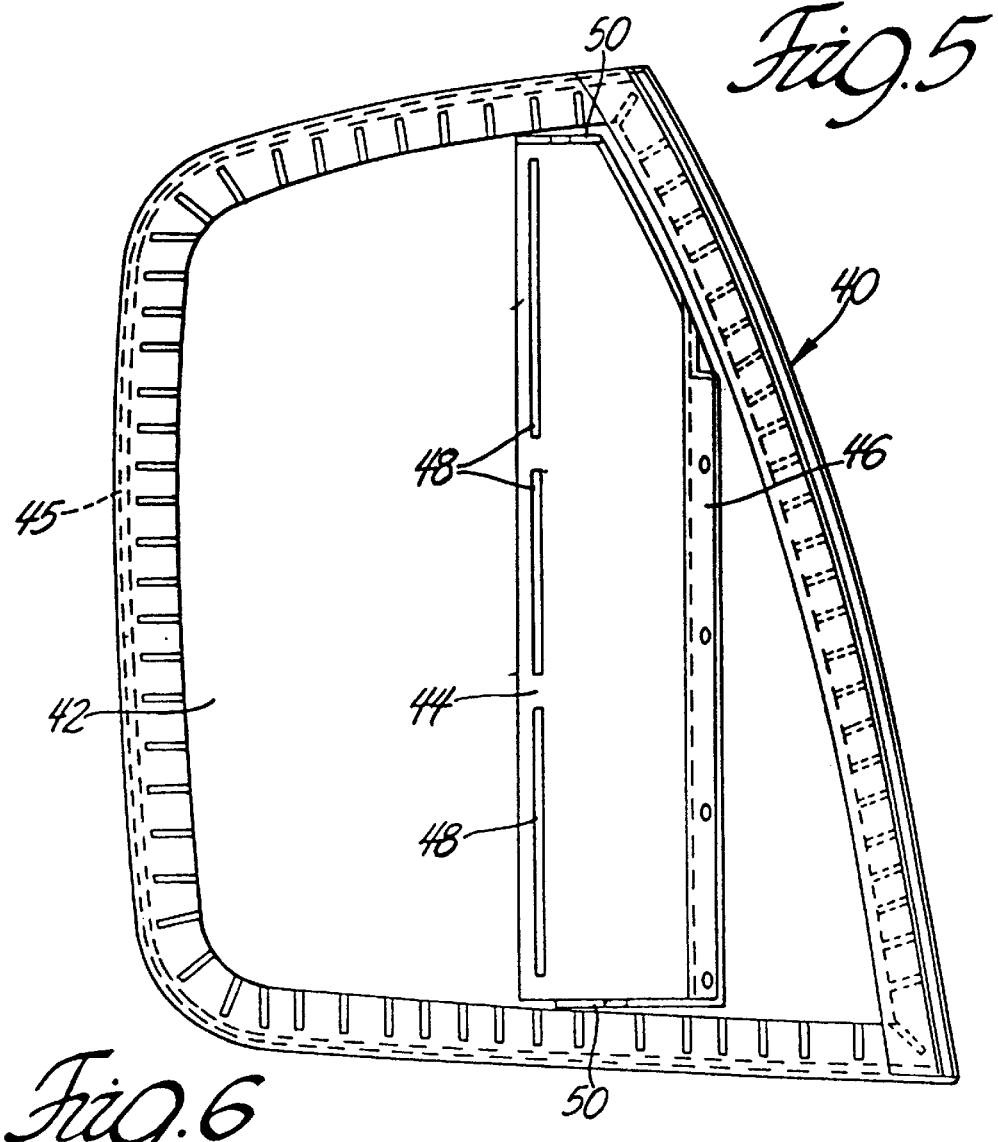

TRIM PANEL HAVING AIR BAG DOOR

This is a continuation-in-part of U.S. patent application Ser. No. 08/690,854 filed Aug. 1, 1996, now U.S. Pat. No. 5,816,609, which is a continuation-in-part of U.S. patent application Ser. No. 08/258,720, now abandoned, filed Jun. 13, 1994.

BACKGROUND OF THE INVENTION

This invention relates generally to interior trim panels for motor vehicles and more particularly to interior trim panels that have a discrete air bag door that is opened by an air bag when it is deployed into the passenger compartment.

U.S. Pat. No. 4,893,833 granted to Anthony J. DiSalvo and David J. Bauer Jan. 16, 1990 discloses a closure arrangement for an air bag deployment opening in an automotive instrument panel that includes a discrete door. The door has an inner supporting layer of aluminum that has a hinging extension at one end that is bolted to a structural support plate underlying the instrument panel. The opposite end of the door is held down by a frangible tab of the door covering that is beneath a lip of the structural support plate of the instrument panel. In a second version, the door has an inner supporting layer of molded plastic that includes an integral hinging flange near one end that is fastened to the air bag canister. The plastic supporting layer of the door also has an integral frangible flange near the opposite end for holding the opposite end of the door down.

U.S. Pat. No. 4,925,209 granted to Hideyki Sakurai May 15, 1990 discloses an assembly for mounting a discrete air bag door having an aluminum insert formed integrally with the air bag door. The aluminum insert has a hinging extension at an upper end of the door that has bolt holes and a folded outer edge that is wrapped around a reinforcing rod. The door is attached to the air bag canister by bolts inserted into the boltholes and the reinforcing rod keeps the door attached in case the insert cracks at the boltholes. The lower end of the door is held down by bolts that extend through cut-outs in the lower end of the cover covering to clamp the lower end of the door covering between a resilient member and a flange of the air bag canister.

U.S. Pat. No. 5,096,221 granted to Richard Coombs and Scott Rafferty Mar. 17, 1992 discloses an interior trim panel for a motor vehicle having a discrete air bag door with two substrates. The second substrate is riveted to the first substrate to reinforce the door. The second substrate has extensions at each end which define a hinged connection at one end of the door and a releasable connection at the opposite end of the door which are attached to flanges of the reinforcing insert of the interior trim panel for holding the door in place until the air bag is deployed.

U.S. Pat. No. 5,116,079 granted to Richard D. Rhodes, Jr. May 26, 1992 discloses an automotive instrument panel having an integrated air bag door. The lower end of the door skin carries a depending flap that is sewn to an inwardly extending flap of the dashboard skin to hold the lower end of the door down. The line of stitching forms a frangible tear seam line.

U.S. Pat. No. 5,238,264 granted to William J. Barnes Aug. 24, 1993 discloses a deployment door for an air bag in which the air bag door comprises a substrate panel that is attached to the substrate of the instrument panel by a Z-shaped hinge strap. The substrate panel has a row of apertures to weaken the door. During deployment the hinge strap which defines a primary hinge axis progressively unfolds and bends while the row of apertures which define a secondary hinge axis allow bending and folding of the door as shown in FIG. 1 of the patent.

U.S. Pat. No. 5,362,096 granted Nov. 8, 1994 to Satoh et al. discloses a metal deployment door for an air bag with a weakened hinge formed by holes and a rivet connection.

U.S. Pat. No. 5,419,583 granted May 30, 1995 to Sakakida et al. discloses a door cover configured to absorb passenger impact forces by yielding under any such impact.

U.S. Pat. No. 5,374,078 granted Dec. 20, 1994 to Amamori et al. discloses a hinge-reinforcing bracket that helps locate a bending hinge point in an air bag deployment door.

U.S. Pat. No. 5,437,470 granted Aug. 1, 1995 to Terai et al. also discloses such a hinge-reinforcing bracket with a V-shaped cross-section.

While each of the above air bag door arrangements may be useful for their intended purposes, there is still room for improvement particularly with respect to the attachment of discrete air bag doors to interior trim panels for motor vehicles, such as instrument panels.

SUMMARY OF THE INVENTION

The object of this invention is to provide improved arrangements for attaching an air bag door to automotive interior trim panels.

In one aspect a feature of the invention is that it provides a simple and efficient frangible attachment for holding the non-hinged end of a discrete air door down by means of the air bag door covering.

In another aspect a feature of the invention is that it provides a simple, efficient, strong and versatile attachment for hinging a discrete air bag door to an automotive trim panel or other support member.

In another aspect a feature of the invention is that the air bag door arrangement of the invention includes a door retainer and a bracket that is attached to the door retainer to control the hinging action of the air bag door in a precise manner.

In another aspect a feature of the invention is that the air bag door arrangement of the invention includes a door retainer and a bracket that is attached to the door to define a primary hinge line and to the substrate of the instrument panel.

In another aspect a feature of the invention is that the bracket has two side plates supported on respective opposite sides of the channel. The side plates are configured and positioned to connect the channel to an air bag canister or a support structure. Because the side plates extend integrally from the channel itself, the bracket weighs less, requires less material and is easier to construct.

In another aspect a feature of the invention is that the channel legs are connected together along common inner edges to form a V-shape.

In another aspect a feature of the invention is that the side plates each extend integrally from respective opposite sides of the second leg of the channel.

In another aspect a feature of the invention is that the bracket end portion, side plates and channel are formed together as a single unitary piece.

In another aspect a feature of the invention is that the bracket end portion includes an elongated front plate configured to attach the bracket to the retainer end flange and trim panel.

In another aspect a feature of the invention is that the channel has a tab that is disposed on an outer end of the second leg and is welded to the retainer.

In another aspect a feature of the invention Is that the retainer end flange is sandwiched between the trim panel and the bracket end portion.

In another aspect a feature of the invention is that the retainer has an L-shaped attachment portion including the end flange and an inboard leg that extends integrally between the end flange and the weakened hinge portion.

In another aspect a feature of the invention is that the trim panel has a substrate and the L-shaped attachment portion of the retainer is attached to a complementary L-shaped portion of the substrate.

In another aspect a feature of the invention is that the weakened hinge portion includes a plurality of spaced-apart through-holes.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 4 is a cross section of second arrangement for attaching an air bat door to an automotive trim panel in accordance with the invention;

FIG. 5 is a plan view of the second arrangement taken substantially along the line 5—5 of FIG. 4 looking in the direction of the arrows;

FIG. 6 is a section of the second arrangement taken substantially along the line 6—6 of FIG. 4 looking in the direction of the arrows;

DESCRIPTION OF THE INVENTION

Figure 1:
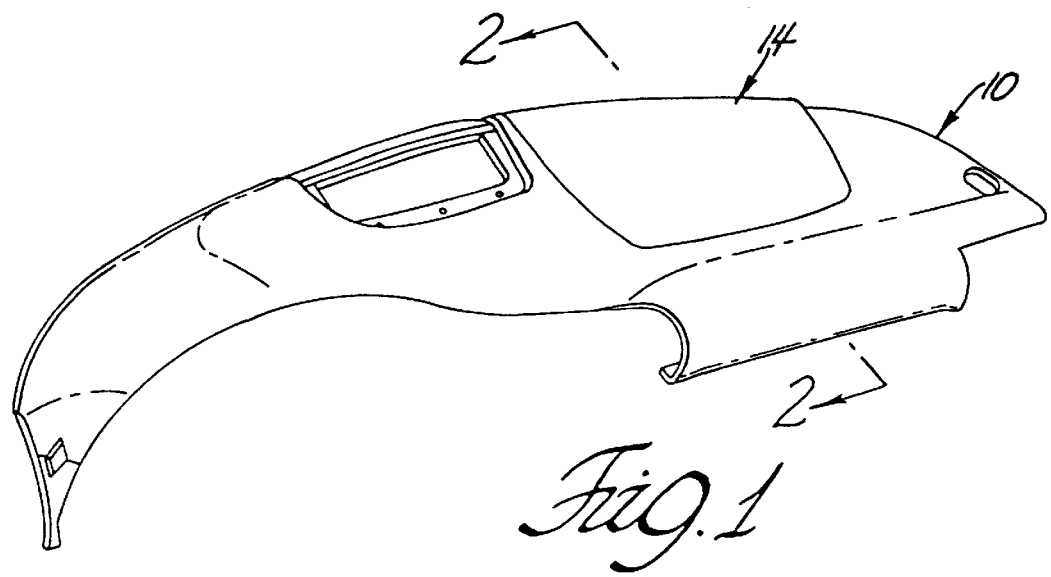
FIG. 1 is a perspective view of a first arrangement for attaching an air bag door to an automotive trim panel in accordance with the invention.

Referring now to the drawing, FIG. 1 shows an automotive interior trim panel 10 having an air bag opening 12 for deployment of an air bag and a discrete air bag door 14 that is attached to the interior trim panel 10 to close the air bag opening. The door 14 is opened by the air bag, which is stored in a canister 15 beneath the door 14, when the air bag is deployed responsive to a predetermined vehicle deceleration in a well-known manner.

The interior trim panel 10 comprises a retainer 16 of relatively rigid plastic material such as polycarbonate, polypropylene or any injection moldable structural plastic and such material may be filled with glass fibers or the like. The retainer 16 may also be a metal casting or stamping that is molded to the final shape needed for functional and pleasing shape of the finished trim panel 10. The retainer 16 can also be made of a porous fiberboard like material and other moldable compositions that meet the specifications for a structural retainer.

The interior trim panel 10 further comprises a cover 18 of relatively soft and flexible decorative material such as expandable foam backed vinyl that is generally die cut from a continuous sheet of the material. Other examples of a suitable stock for cover 18 include laminations, organic or synthetic cloth or cloth combinations, foam, plastic and other materials generally used in automotive trim panels.

The air bag opening 12 is defined by the retainer 16 and the air bag door 14 is mounted on the retainer 16 by means or an annular metal bracket 20 that is aligned with the air bag opening 12 and fastened to the underside of the retainer 16.

The air bag door 14 is a composite structure comprising a retainer 22 of relatively rigid material, such as steel sheet metal, and a cover 24 of relatively soft and flexible material. The retainer 22 is formed integrally with the air bag door 14 for defining the shape of the air bag door 14 and the cover 24 matches the cover 18 of the interior trim panel 10. In this particular instance the covers 18 and 21 are both made of an expanded vinyl which comprises a skin or outer layer and an integral resilient foam-backing layer.

The air bag retainer 22 includes an integral hinge flange 26 near one end by means of which the air bag door 14 is attached to the trim panel 10 to cover the air bag opening 12. In this particular instance, the hinge flange 26 is clamped by walls of the bracket 20 and the trim panel retainer 16 through the operation of threaded fasteners 28 that extend through holes in the hinge flange.

Figure 2:
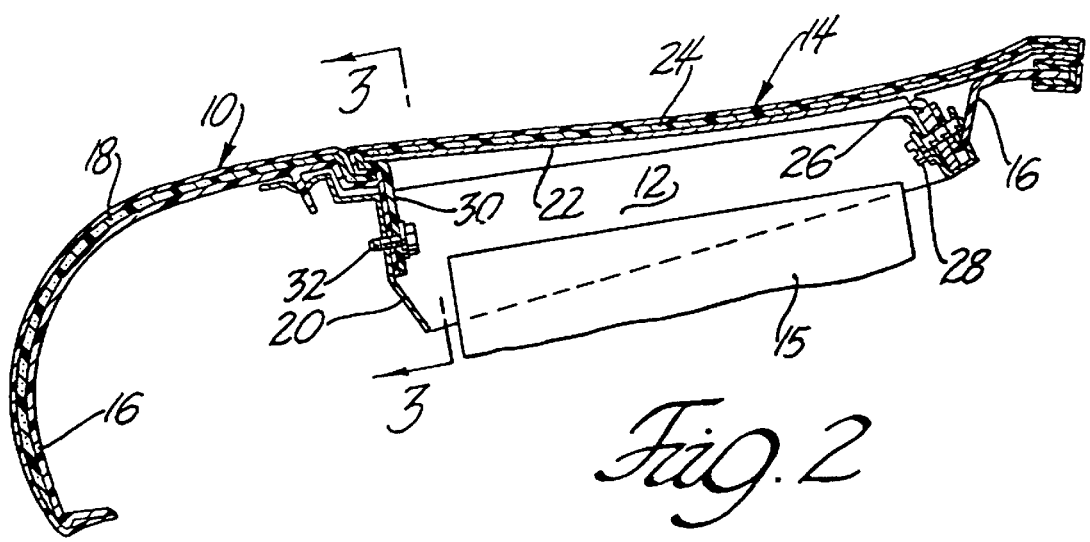
FIG. 2 is a cross section of the first arrangement taken substantially along the line 2—2 of FIG. 1 looking in the direction of the arrows.
Figure 3:
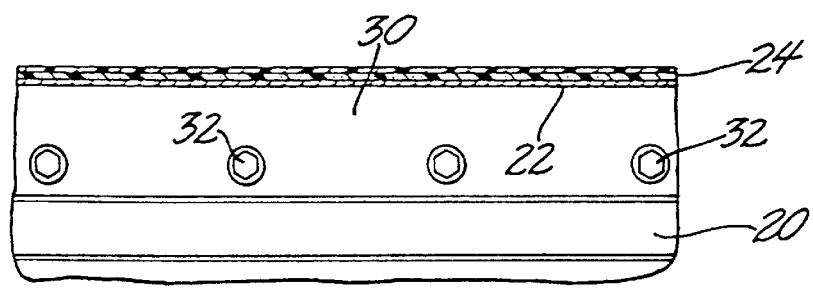
FIG. 3 is a section of the first arrangement taken substantially along the line 3—3 of FIG. 2 looking in the direction of the arrows.
Figure 7:
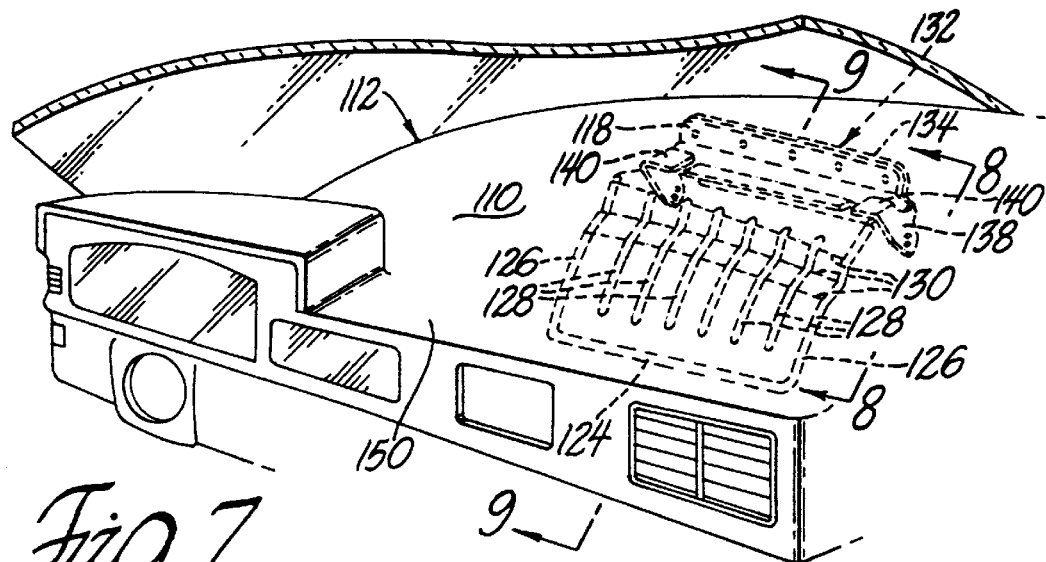
FIG. 7 is a cross section of a third arrangement for attaching an air bag door to an automotive trim panel in accordance with the invention.
Figure 8:
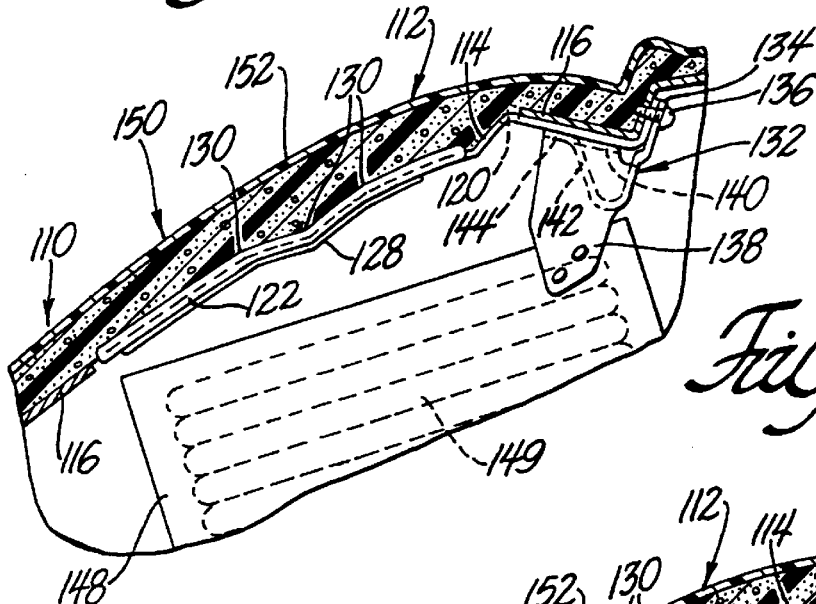
FIG. 8 is a plan view of the third arrangement taken substantially along the line 8—8 of FIG. 7 looking in the direction of the arrows.
Figure 9:
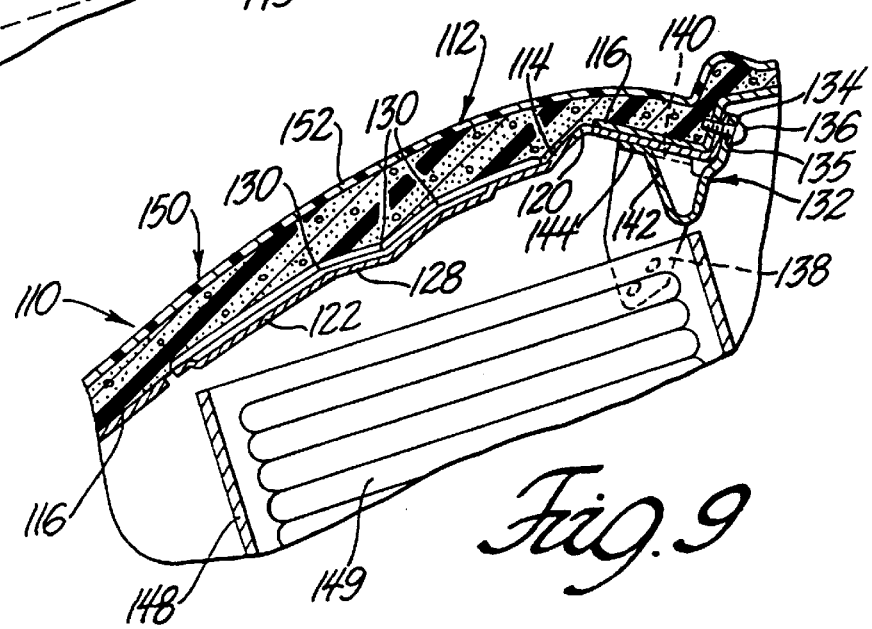
FIG. 9 is a section of the third arrangement taken substantially along the line 9—9 of FIG. 7 looking in the direction of the arrows.
Figure 10:
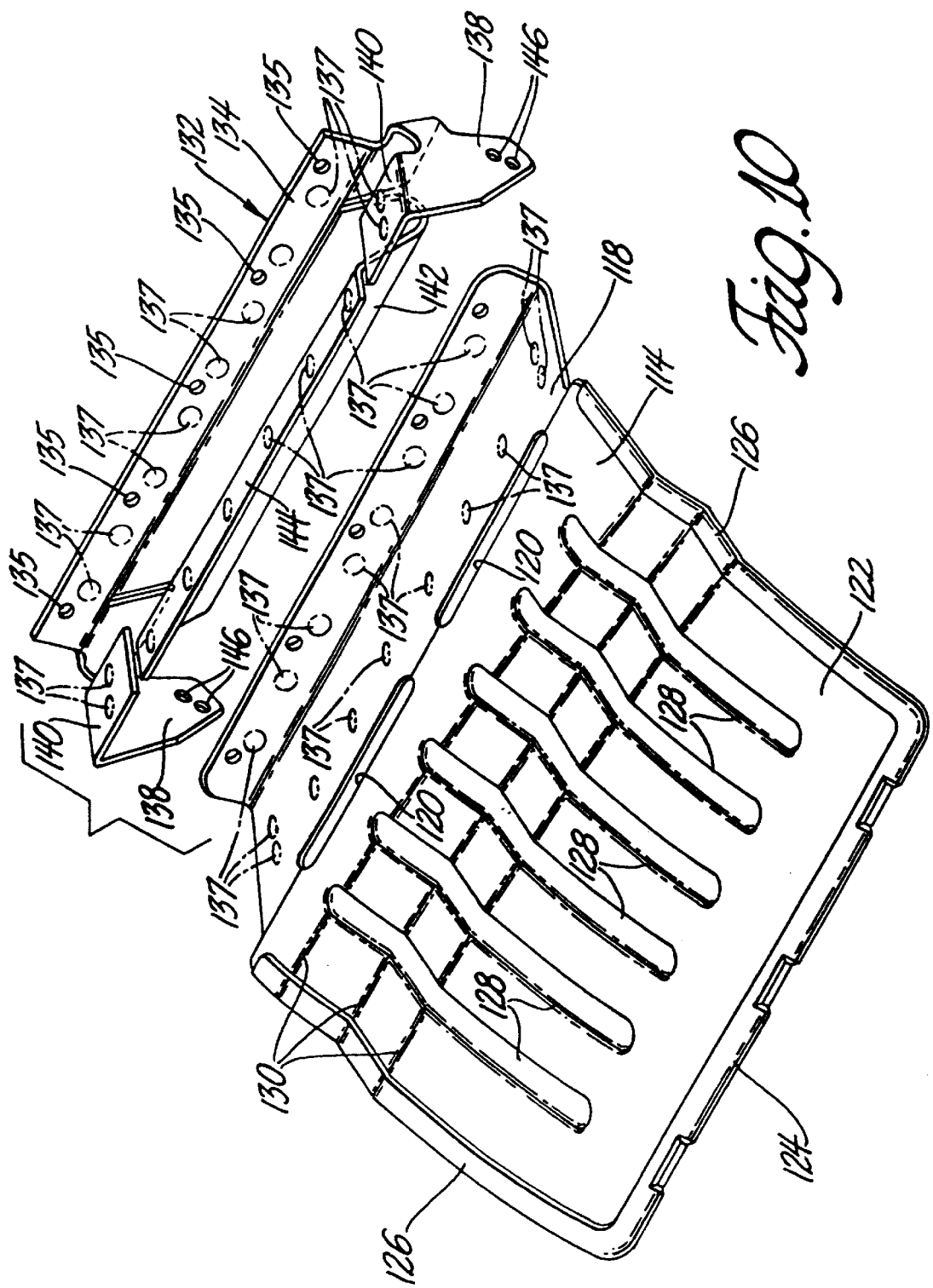
FIG. 10 is an exploded perspective view of internal components of the third arrangement shown in FIGS. 7, 8 and 9.

The opposite or unhinged end of the air bag door 14 is held down by a frangible attachment that gives way when the air bag door 14 is opened in response to air bag deployment. This frangible hold-down attachment comprises an extension flap 30 of the cover 24 of the air bag door 14 that extends past the end of the retainer 22 remote from the hinge flange 26. The flap 30 is fastened to the trim panel bracket 20 by a plurality of bolts 32 that extend through preformed holes in the flap 30 and screw into the bracket as shown in FIG. 2. The bolt heads engage the foam backing of the expanded vinyl cover 24 and clamp the skin against the bracket. The bolt holes 32 are spaced far enough from the edge of the flap 30 to hold the unhinged end of the air bag door 14 firmly in place yet close enough to the edge so that the bolts 32 pull through the flap 30 from the bolt holes to the edge without any appreciable resistance when the air bag door 14 is opened in response to air bag deployment. The flap 30 can also be fastened to the bracket 20 by sheet metal screws that cut their own holes in the flap 30 as they are screwed into place.

With regard to the frangible hold down feature, it should be noted that the unhinged end of the air bag door retainer 24 overlaps a ledge of the trim panel 10 at the opening 12 that is nested in a ledge of the trim panel bracket 20. Thus the frangible hold down feature also establishes a very good continuity of the outer surfaces of the trim panel 10 and the discrete air bag door 14 at the unhinged end of the door.

Referring now to FIGS. 4, 5 and 6, a second arrangement for attaching an air bag door to an interior trim panel is illustrated. In this second arrangement, the interior trim panel 10 has a discrete air bag door 40 comprising a retainer 42, a bracket 44 and a cover 46. The retainer is made of relatively rigid material, such as steel sheet metal, and formed integrally with the discrete air bag door 40 for defining the shape of the air bag door 40.

The door bracket 44 is made of heavier gage steel and spot-welded or otherwise suitably attached to the retainer 42. It reinforces the air bag door 40, attaches the air bag door 40 to the trim panel 10 and establishes the hinge location for pivoting a portion of the air bag door 40 to an open position responsive to air bag deployment.

The door bracket 44 includes an integral flange 46 at one end that is near one end of the retainer 42 by means of which the air bag door 40 is attached to the trim panel 10 to cover the air bag opening 12. Like the first arrangement, the integral flange 46 is clamped by walls of the bracket 20 and the trim panel retainer 16 through the operation of threaded fasteners 28 that extend through holes in the flange. However, unlike the first arrangement the integral flange 46 does not establish the hinge line for pivoting the portion of the air bag door 40 over the air bag canister 15 to an open position responsive to air bag deployment. In this instance the door bracket 44 locates the hinge line rearward of the integral flange 46, that is, closer o the vehicle occupants and further away from the windshield. The hinge line is established by the body of the door bracket 44 which has a line of slots 48 that define a weakened hinge portion of the body that is substantially parallel to the flange 46. The relocated hinge line shortens the portion of the air bag door 40 that needs to be pivoted to the open position by the deploying air bag. Consequently, the designer is not limited to pivoting the entire door portion overlying trim panel opening 14 as in the case of the air bag door 12.

The door bracket 44 also preferably includes narrow flanges 50 on opposite sides of the main body for attaching the air bag door 40 to the trim panel bracket 20. These side flanges 50 are located between the slots 48 and the end flange 46 so that they do not interfere with the opening of the door portion on the opposite side of the slots 48. These side flanges 50 also assist in firmly establishing the hinge line at the weakened hinge portion of the slots 48.

The door bracket 44 holds the air bag door 40 firmly in the closed position until the air bag is deployed—particularly in the case where the side flanges 50 are included. However, in some instances it may also be desirable to provide a positive hold down at the unhinged end of the air bag door 40. In those instances, the frangible hold down arrangement illustrated in conjunction with the air bag door 14 may be incorporated in the air bag door 40.

As indicated above the door bracket 44 is heavier gage steel than the retainer 12 and in this regard a ratio of about 3 to 1 is recommended. Of course other materials may be used. In any event, the objective is to minimize weight while retaining adequate strength for maintaining the shape of the door and keeping the door attached to the trim panel during air bag deployment.

When a metal such as steel is used for the door retainer 42, the edges may be slotted and rolled as shown in FIG. 6. This provides a round edge for the air bag door 40 that is easier to match with the air bag opening 12. It also provides grooves in the inner margin of the retainer 42 for improved bonding of the cover 24 which is made of a relatively soft material which matches the cover of the interior trim panel 10.

Figure 11:
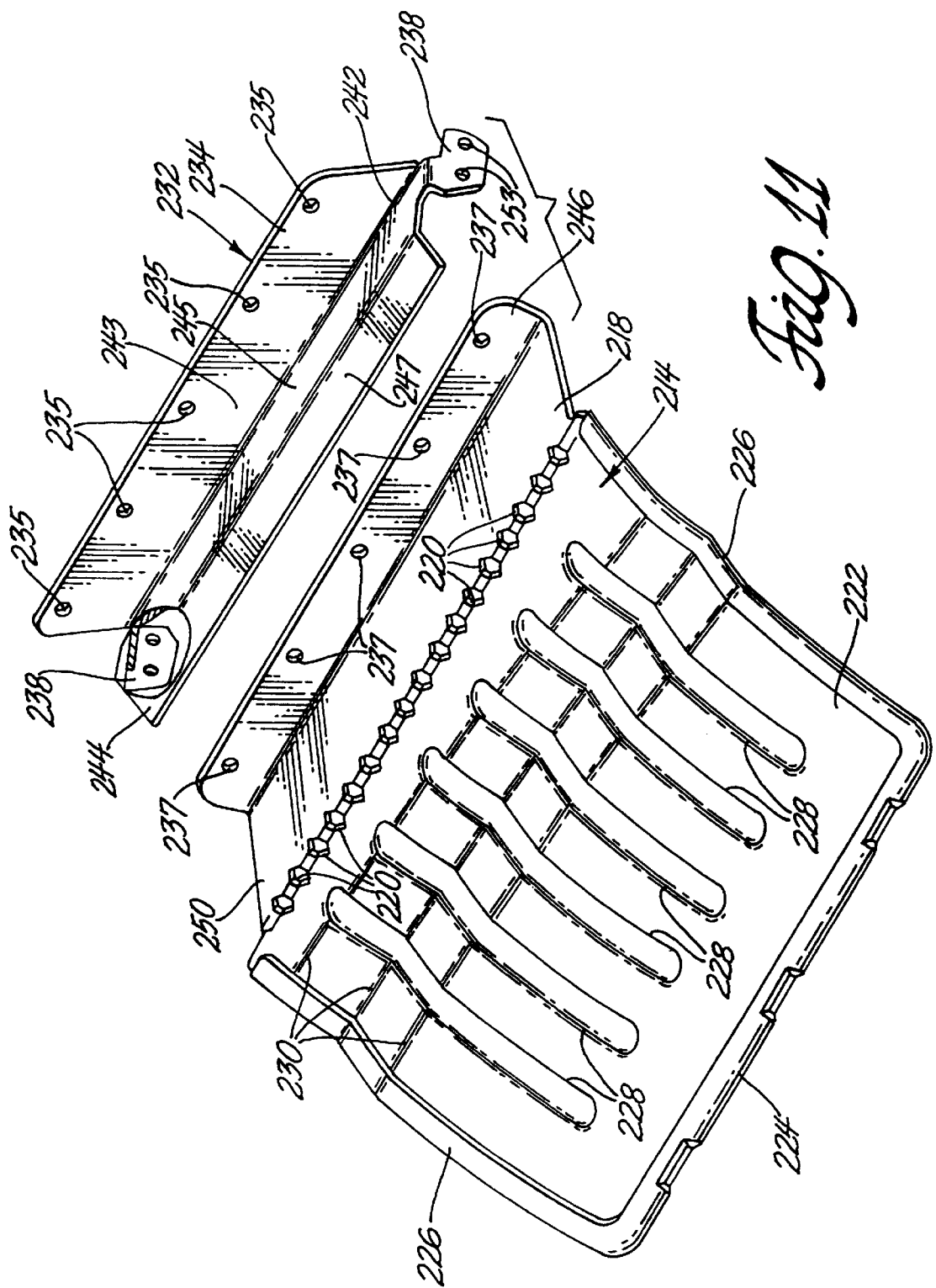
FIG. 11 is an exploded perspective view of internal components of a fourth arrangement for attaching an air bag door to an automotive trim panel in accordance with the invention.
Figure 12:
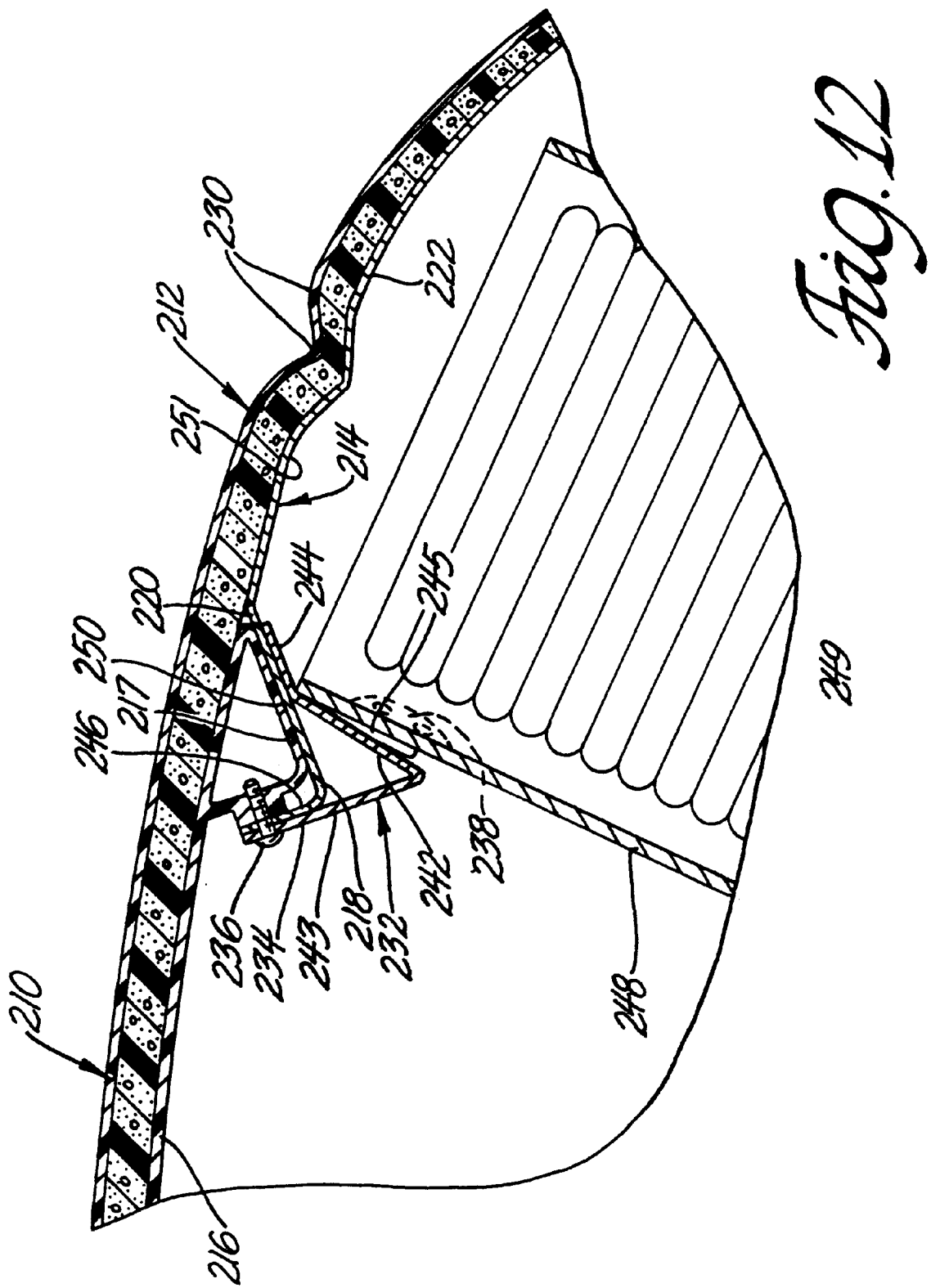
FIG. 12 is a cross-sectional end view of the fourth arrangement of FIG. 11.

A third arrangement for attaching an air bag door to an interior trim panel is shown in FIGS. 7–10. A fourth arrangement is shown in FIGS. 11 and 12. Reference numerals in the two-hundreds in FIGS. 11 and 12 indicate alternative configurations of elements that also appear in the third arrangement. Unless indicated otherwise, where a portion of the following description uses a reference numeral in the one-hundreds to refer to elements shown in FIGS. 7–10, I intend that portion of the description to apply equally to elements designated by numerals in the two-hundreds in FIGS. 11 and 12.

In the third arrangement, the automotive instrument panel 110 is equipped with an integrated air bag door of the invention that is indicated generally at 112. An integrated air bag door, also known as an invisible air bag door, has a covering that is an integral part of the covering for the trim or instrument panel.

The integral air bag door 112 comprises a retainer 114 that is made of a light metal, such as steel sheet metal and formed to define the shape of the air bag door. The retainer 114 is then attached to a substrate 116 of the instrument panel 110 to close an opening in the substrate for deployment of an air bag into the passenger compartment of the automobile. The panel substrate 116 is generally molded of a fiber reinforced structural plastic material.

The door retainer 114 has an L-shaped attachment portion 118 at one end that is shaped to fit beneath a complimentary L-shaped edge portion of the panel substrate 116 that is next to the air bag opening. A weakened hinge line is provided in the door retainer 114 by a plurality of aligned perforations 120, such as the two elongated end-to-end slots shown in FIGS. 7–10. The weakened hinge line borders the attachment portion 118 and demarcates a closure portion 122 of the door retainer 114. The closure portion 122 fills practically the entire opening in the instrument panel substrate 116 so that the weakened hinge line is very close to the edge portion of the panel substrate 116.

The closure portion 122 of the door retainer 114 has a reinforced free end 124 and reinforced sides 126 that are formed by folding over free end and side portions of the door retainer 114 onto themselves to form a double thickness of material. The closure portion 122 also includes a plurality of laterally spaced stiffening ribs 128 that are generally parallel to the reinforced sides 128. The stiffening ribs 128 are rounded indentations or depressions formed in the closure portion 122. The reinforced end and sides 124, 126 and the ribs 128 reduce the deflection characteristics of the closure portion 122 of the door retainer that is fastened to the panel substrate 116 in cantilever fashion by the attachment portion 118. The attached door retainer 114 retains its shape during the manufacturing process and in subsequent service due to the low deflection characteristics.

The closure portion 122 also has a plurality of lateral creases 130 that contribute to the stiffness of the part. However, the creases 130 are primarily for aesthetic purposes, that is, to shape the contour of the closure portion 122 to match the contour of the instrument panel 110.

The air bag door 112 includes a bracket 132 that may be made of a heavier gage steel and that is welded or otherwise suitably attached to the door retainer 114. Bracket 132 reinforces the air bag door 112, attaches the air bag door 112 to the instrument panel 110 and establishes the hinge location for pivoting the air bag door 112 to an open position responsive to air bag deployment. More particularly, bracket 132 fastens the door retainer 114 by clamping the L-shaped attachment portion 118 of the door retainer 114 firmly against the L-shaped edge portion of the panel substrate 116 so that the door retainer 114 bends across the weakened hinge line provided by perforations 120.

The bracket 132 includes a front plate 134. The front plate 134 cooperates with a plurality of fasteners 136 such as sheet metal screws that force the front plate 134 tightly against a generally vertical, outboard leg of the L-shaped attachment portion 118 and the corresponding leg of the L-shaped edge of the panel substrate 116 in sandwich fashion. Bracket 132 has a right-angled gusset plate 138 at each end that is integral with a side edge of the front plate 134. Each gusset plate 138 extends rearwardly and has an inwardly directed, right-angled tab 140 at the top edge. Tabs 140 are generally perpendicular to the front plate 134. These tabs are welded to the lower surface of the generally horizontal, inboard leg of the L-shaped attachment portion 118 that is adjacent the hinge line formed by the perforations 120 in the door retainer 114.

Bracket 132 also includes a deep narrow channel 142 that diverges upwardly and is open at the top. One wall of channel 142 is an integral extension of the mid- section of front plate 134. The opposite wall of the channel 142 terminates in a long narrow tab 144 that is also welded to the lower surface of the attachment portion 118 near the hinge line.

The front plate 134 has a plurality of laterally spaced holes 135 that are aligned with a plurality of laterally spaced holes in the end leg of the L-shaped attachment portion 118 of the door retainer 114. These holes receive fasteners 136, such as sheet metal screws that force the front plate 134 tightly against the attachment portion 118 and the instrument panel substrate 116 in sandwich fashion. The gusset plates 138, welded tabs 140, channel 142 and welded tab 144 hold the L-shaped attachment portion 118 in close conformance to the complimentary shaped edge portion of the panel substrate thus securely fastening the door retainer 114 in place.

Each gusset plate 138 has a plurality of holes 146 that are used to bolt or otherwise suitably secure the bracket 132 to a support structure beneath the instrument panel 13. The support structure may be an airbag canister or housing as is schematically shown at 148 beneath the airbag opening of the panel substrate 116. The gusset plate 138 may alternatively be secured to other suitable support structure of the automobile such as a cross car beam, front of dash panel, firewall, or floor pan.

The airbag canister 148 houses a deflated airbag shown schematically at 149 that operates in a well-known manner. Briefly, the airbag is inflated by a gas generator (not shown) and deployed in the passenger compartment through the air bag opening when the automobile decelerates at a rate indicative of a collision.

The instrument panel 112 includes a covering 150 that covers the substrate 116 and the door retainer 118 so that the covering of the air bag door 114 is an integral part of the covering of the instrument panel 110. The covering 150 comprises an outer skin 152 and an underlying layer of foam, that are customarily made of compatible thermoplastic materials, such as polyvinylchloride and polyvinychloride foam or polyurethane and polyurethane foam.

The door retainer 114 is attached to the panel substrate 116 by the bracket 132 before the door retainer 114 and the panel substrate 116 are covered by the outer covering 150.

The bracket 132 holds the door retainer 114 firmly in place after it is attached to the substrate 116 due to the presence of the gusset plates 138 and the channel 142 and their respective welded tabs 140, 144 even though the bracket 132 may not be attached to the canister 148 or other support structure. This characteristic facilitates further processing of the instrument panel, particularly the simultaneous covering of the instrument panel 110 and the air bag door 112 with the same integrated cover 150. This is commonly done by placing the instrument panel substrate 116, door retainer 114 and bracket 132 assembly and a cast outer skin 152 spaced apart in a mold. The foam layer is then molded in place between the assembly and the cast outer skin to form the integrated covering 150 for the instrument panel 110 and air bag door 112.

The canister 148 may be attached to the bracket 132 either before or after the instrument panel 110 is covered. In fact the canister 148 may be attached to the bracket 132 after the instrument panel is installed in the automobile.

In any event, the installed instrument panel 110 works in the following manner. When the air bag 149 deploys it engages the door retainer 114 and pivots the closure portion 122 outwardly about the weakened hinge line at perforations 120. The bracket 132 holds the attachment portion 118 firmly in place due to the presence of the gusset plates 138 and the channel 142 that are welded to the inboard leg portion by tabs 140 and 144 respectively.

As the inflating air bag pivots the door outwardly, the covering 150 is ruptured at the front or free edge of the door retainer 114 and then along the sides of the door retainer 114 forming a flap. The flap is opened along with the closure portion 122 of the door retainer 114 under the action of the inflating air bag. The outer skin 152 preferably includes an internal or external groove or scribe line that outlines at least the closure portion 122 of the door retainer 114. The scribe line facilitates rupture at the free end and sides of the closure portion 122 as the deploying air bag pushes the closure portion 122 outwardly. The folded over, reinforced edges 124 and 126 at the free end and sides of the door retainer stiffen these edge portions to further facilitate skin rupture.

As shown in FIG. 12, the fourth arrangement for attaching an air bag door to an interior trim panel includes an interior trim panel, generally indicated at 210 in FIG. 12, that has an opening for a deploying air bag 249. The trim panel 210 also includes an air bag door, generally indicated at 212 in FIG. 12, that is attached to the interior trim panel 210. Similar to the third arrangement, the door 212 is configured to close the opening and to be opened by the air bag 249 when the air bag 249 is deployed.

As with the third arrangement, the fourth arrangement includes a sheet metal air bag door retainer generally indicated at 214 in FIGS. 11 and 12. The air bag door retainer 214 is formed integrally with the air bag door 212 as shown in FIG. 12. As is also shown in FIG. 12, the air bag door retainer 214 defines an initial shape of the air bag door 212. A sheet metal bracket 232 is attached to the retainer 214 to secure the air bag door 212 to the trim panel 210 in a position where the door 212 can close the opening. The bracket 232 is also attached is such as way as to allow the air bag 249 to open the air bag door 212 when the air bag 249 is deployed. The bracket 232 has an end portion in the form of a front plate shown at 234 in FIGS. 11 and 12. The front plate 234 secures the air bag door 212 to the trim panel 210.

The door retainer 214 has an end flange, shown at 246 in FIGS. 11 and 12, that secures the door retainer 214 to either the trim panel 210 or the bracket front plate 234. The door retainer 214 has a closure portion, shown at 222 in FIGS. 11 and 12, that is spaced from the end flange 246 and is configured to close the air bag deployment opening in a closed position shown in FIG. 12. The door retainer 214 also includes a weakened hinge portion that is disposed between the retainer end flange 246 and the retainer closure portion 222. The weakened hinge portion of the retainer 214 pivots the retainer closure portion 222 to an open position responsive to deployment of the air bag 249. The weakened hinge portion is weakened by a plurality of spaced-apart hexagonal or generally circular through-holes shown at 220 in FIGS. 11 and 12. As is best shown in FIG. 11, the holes 220 are aligned in a single row disposed parallel to the end flange 246.

The bracket 232 includes a V-shaped channel, shown at 242 in FIGS. 11 and 12, that is disposed between the bracket front plate 234 and the weakened hinge portion of the retainer 214. The channel 242 opens outward away from the position of the air bag canister 248 and toward the retainer 214. The channel 242 has a leg 243 that extends integrally inward from the bracket front plate 234 and a second leg 245 that is secured by welding or other suitable means to the retainer 214 adjacent and parallel to the weakened hinge portion. The channel legs 243, 245 are connected together along common inner edges to form the outwardly opening V-shape.

The channel 242 also has an elongated tab 244 that extends integrally from along an outer edge of the second leg 245. The tab 244 is bent outward from the second leg 245 to allow an outer surface 247 of the tab 244 to lie flush with an inner surface 251 of the retainer 214. The outer surface 247 of the tab 244 is welded to the inner surface 251 of the retainer 214 adjacent the weakened hinge portion between the weakened hinge portion and the retainer end flange 246.

Unlike the third arrangement, the bracket 232 of the fourth arrangement has two side plates shown at 238 in FIGS. 11 and 12. The side plates 238 are supported on respective opposite sides of the channel 242. The side plates 238 are configured and positioned to connect the channel 242 to the air bag canister 248 as shown in FIG. 12 or, alternatively, to a support structure. Because the side plates 238 extend integrally from the channel 242 itself, the bracket 232 weighs less, requires less material and is easier to construct than if it included gusset plates 138 supported on side flanges as in the 3rd arrangement described above and shown in FIGS. 7–10.

The side plates 238 each extend integrally from respective opposite sides of the second leg 245 of the channel 242 and are then bent inward at a right angle to the second leg 245. The inward right angle bend in each side plate 238 facilitates attachment to outer sidewalls of the air bag canister 248. As is best shown in FIG. 11, each side plate 238 includes a pair of through holes 253 to receive fasteners such as screws or bolts. The fasteners extend through the side plate through holes and into corresponding holes in the air bag canister 248 to fasten the side plates 238 to the air bag canister 248.

The bracket front plate 234, side plates 238 and channel 242 are formed together as a single unitary piece. This is done by first stamping the bracket 232 from a single flat piece of sheet metal. The sheet metal stamping is then bent in appropriate locations to shape the bracket 232 as shown in FIGS. 11 and 12.

The retainer 214 has an L-shaped attachment portion, shown at 218 in FIGS. 11 and 12, that includes the end flange 246 and an inboard leg 250 that extends perpendicularly and integrally from the end flange 246 to the weakened hinge portion of the retainer 214. The trim panel 210 has a substrate 216 and the L-shaped attachment portion of the retainer 214 is attached to a complementary and integrally inwardly extending L-shaped portion 217 of the substrate 216.

The bracket front plate 234 is configured to attach the bracket 232 to the retainer end flange 246 and trim panel 210 as shown in FIG. 12. The front plate 234 includes five through holes 235 that are aligned with five corresponding through holes 237 in the end flange 246 of the retainer 214 and five corresponding through holes in the L-shaped portion 217 of the trim panel substrate 216. The retainer end flange 246 is sandwiched between the L-shaped portion 217 of the trim panel substrate 216 and the bracket front plate. Five fasteners 236 pass through the holes 235 in the bracket front plate 234, the holes 237 in the retainer end flange 246 and the holes in the L-shaped portion 217 of the trim panel substrate 216.

The various aspects of the invention have been described in an illustrative manner, and it is to be understood that the terminology that has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An interior trim panel for a motor vehicle having an opening for deployment of an air bag and an air bag door that is attached to the interior trim panel for closing the opening and for being opened by an air bag when the air bag is deployed comprising;

a sheet metal air bag door retainer formed integrally with the air bag door for defining an initial shape of the air bag door, and a sheet metal bracket attached to the retainer for securing the air bag door to the trim panel for closing the opening and for being opened by the air bag when the air bag is deployed;

the bracket having an end portion securing the air bag door to the trim panel;

the door retainer having an end flange securing the retainer to one of the trim panel and the bracket end portion;

the door retainer having a closure portion spaced from the end flange and configured to close the air bag deployment opening in a closed position;

the door retainer having a weakened hinge portion disposed between the end flange and the closure portion to pivot the closure portion to an open position responsive to deployment of the air bag;

the bracket having a channel disposed between the bracket end portion and the weakened hinge portion of the retainer, the channel opening toward the retainer, the channel having a leg that is an integral extension of the bracket end portion and a second leg that is secured to the retainer adjacent the weakened hinge portion; and the bracket having two side plates supported on respective opposite sides of the channel to connect the channel to an air bag canister or a support structure to provide a bracket that weighs less, requires less material and is easier to construct.

2. The interior trim panel as defined in claim 1 wherein the channel legs are connected together along common inner edges to form a V-shape.

3. The interior trim panel as defined in claim 1 wherein the side plates each extend integrally from respective opposite sides of the second leg of the channel.

4. The interior trim panel as defined in claim 1 wherein the bracket end portion, side plates and channel are formed together as a single unitary piece.

5. The interior trim panel as defined in claim 1 wherein the bracket end portion includes an elongated front plate configured to attach the bracket to the retainer end flange and trim panel.

6. The interior trim panel as defined in claim 1 wherein the channel has a tab that is disposed on an outer end of the second leg and is welded to the retainer.

7. The interior trim panel as defined in claim 1 wherein the retainer end flange is sandwiched between the trim panel and the bracket end portion.

8. The interior trim panel as defined in claim 1 wherein the retainer has an L-shaped attachment portion including the end flange and an inboard leg that extends integrally between the end flange and the weakened hinge portion.

9. The interior trim panel as defined in claim 8 wherein the trim panel has a substrate and the L-shaped attachment portion of the retainer is attached to a complementary L-shaped portion of the substrate.

10. The interior trim panel as defined in claim 1 wherein the weakened hinge portion includes a plurality of spaced-apart through-holes.

* * * * *